Patented Nov. 22, 1938

2,137,314

UNITED STATES PATENT OFFICE

2,137,314

PROCESS OF PRODUCING QUATERNARY AMMONIUM COMPOUNDS

Heinrich Ulrich and Ernst Ploetz, Ludwigshafen-on-the-Rhine, Germany, assignors to I. G. Farbenindustrie Aktiengesellschaft, Frankfort-on-the-Main, Germany No Drawing. Application May 7, 1936, Serial No. 78,410. In Germany May 22, 1935

13 Claims. (Cl. 260—584)

The present invention relates to a process of producing quaternary ammonium compounds.

We have found that quaternary ammonium compounds can be prepared in an advantageous manner by causing alkylene oxides to act under a pressure above atmospheric pressure on salts of a nitrogenous base, i. e., ammonia or of amines. The reaction may be carried out in the absence of water, anhydrous salts of the quaternary ammonium bases thus being directly obtained by a smooth reaction. Temperatures up to about 100° C. are usually very satisfactory. For example the quaternary salts are formed within a short time merely by heating at from about 50° to 100° C. The reaction may also be carried out in the presence of water.

It is preferable to employ amounts of alkylene oxides which are approximately equal to those theoretically necessary for the preparation of the quaternary compounds, or a slight excess over such amounts; when starting from tertiary amines, 1 molecular proportion of alkylene oxide or slightly more should advantageously be employed for 1 molecular proportion of amine, in the case of secondary amines, 2 molecular proportions of alkylene oxide or a slight excess over this amount should be used, and so on.

Generally speaking the increased pressure is employed which is produced under the reaction conditions by working in a closed vessel. The pressure may, however, be still further increased by pressing in inert gases, as for example nitrogen.

The salts of ammonia or of primary, secondary or tertiary amines with organic acids, such as acetic, butyric or stearic acid or inorganic acids, for example strong inorganic acids such as hydrochloric or sulphuric acid are suitable for carrying out the reaction. The amines may contain one or more hydroxyalkyl radicles or may be free from such radicles. The salts of amines having alkyl radicles of high molecular weight are also suitable. The corresponding bases may be set free from the resulting quaternary ammonium salts.

The products obtained, which are quaternary ammonium compounds containing at least one hydroxyalkyl group, may be employed for example as valuable assistants for the textile and like industries, as dyestuff intermediates, or for pharmaceutical purposes. By starting from suitable amines, products may also be obtained which may be employed as dyestuffs. The quaternary ammonium compounds obtainable according to the present invention containing at least one high molecular aliphatic radicle are especially valuable for many purposes.

The following examples will further illustrate the nature of this invention but the invention is not restricted to these examples. The parts are by weight.

Example 1

560 parts of triethanolamine hydrochloride and 140 parts of ethylene oxide are heated to 100° C. in an autoclave. After heating for two hours, all the ethylene oxide has entered into reaction. A syrupy crystal pulp is obtained which solidifies completely after standing for some time and which consists to the extent of about 86 per cent of tetra-ethanolammonium chloride. A little unchanged initial material is also present.

Example 2

1200 parts of triethanolamine are neutralized with 820 parts of 48 per cent sulphuric acid and heated together with 400 parts of ethylene oxide in an autoclave at from 80° to 100° C. until excess pressure is no longer present. After dehydration, 1970 parts of a water-clear, non-crystallizing product of a syrupy nature are obtained which still contains unconverted triethanolamine in the form of the free base.

If the resulting product be neutralized with 130 parts of 48 per cent sulphuric acid and the product be reacted under the above conditions with a further 50 parts of ethylene oxide, it is possible to convert 95 per cent of the triethanolamine sulphate into the quaternary ammonium compound.

Example 3

1550 parts of triethanolamine sulphate and 400 parts of ethylene oxide are heated together in an autoclave at from 60° to 70° C. until excess pressure can no longer be detected. 1900 parts of a water-clear mass of syrupy consistency are obtained. By reacting with barium hydroxide, filtering off the barium sulphate, and concentrating the filtrate, the free base is obtained. 86 per cent of the triethanolamine employed has been converted into tetraethanol ammonium hydroxide; there is also still some triethanolamine present.

Example 4

430 parts of triethanolamine stearate and 50 parts of ethylene oxide are heated under pressure at 90° C. The reaction is completed after 2 to 3 hours. The tetraethanol ammonium stearate formed is readily soluble in water. In alcohol it reacts neutral to phenol-phthalein, while the stearic acid contained in triethanolamine stearate when dissolved in alcohol is capable of titration with caustic soda using phenol-phthalein as indicator.

*Example 5*

300 parts of the triethanolamine salt of acid octodecyl sulphuric ester are stirred with 400 parts of water and heated with 50 parts of ethylene oxide at from 50° to 60° C. under pressure. The tetra-ethanol ammonium salt is more readily soluble than the initial material and has a neutral reaction in water and in alcohol.

*Example 6*

300 parts of a 20 per cent solution of trimethylamine are neutralized with 100 parts of concentrated hydrochloric acid and treated for 3 hours with 50 parts of ethylene oxide under pressure at 60° C. After the said period, all the ethylene oxide has been absorbed. 450 parts of a solution are obtained which has a neutral reaction in alcohol. Choline hydrochloride has been formed in practically a quantitative yield.

*Example 7*

73 parts of diethylamine are neutralized with 200 parts of 24 per cent sulphuric acid and heated in an autoclave at 60° C. with 100 parts of ethylene oxide. By adding 150 parts of barium hydroxide to the resulting solution, the base is set free. About 96 per cent of the diethylamine employed have been converted into the diethyldiethanol ammonium compound.

*Example 8*

500 parts of ammonium sulphate, 500 parts of water and 1350 parts of ethylene oxide are heated in an autoclave at from 90° to 100° C. After some hours, the reaction is completed. The resulting solution is freed from sulphuric acid by means of 1200 parts of barium hydroxide. The product contains more than 50 per cent of tetra-ethanol ammonium hydroxide.

*Example 9*

245 parts of a mixture of tertiary amines each of which contains two methyl groups and an alkyl radicle of high molecular weight which corresponds to the alcohols obtainable by the reduction of palm kernel fatty acids, are stirred with 500 parts of water and neutralized with 200 parts of 25 per cent sulphuric acid. The resulting solution is heated in a pressure vessel with 50 parts of ethylene oxide at from 90° to 100° C. All the ethylene oxide is absorbed within an hour. 1000 parts of an about 34 per cent solution of a quaternary ammonium sulphate containing two methyl groups, an ethanol group and an alkyl group of high molecular weight of the above type are obtained.

*Example 10*

80 parts of pyridine are neutralized with 200 parts of 25 per cent sulphuric acid and heated for an hour at from 90° to 100° C. in a closed vessel after the addition of 50 parts of ethylene oxide. A solution of ethanol pyridinium sulphate is obtained.

*Example 11*

107 parts of ammonium chloride are heated in a closed vessel together with 360 parts of ethylene oxide at 80° C. until the reaction is completed. A syrupy mass is obtained which contains 96 per cent of the theoretical amount of the quaternary organic ammonium compound formed.

*Example 12*

270 parts of a 32 per cent aqueous solution of morpholine are neutralized with 100 parts of concentrated hydrochloric acid. The solution formed is heated with 95 parts of ethylene oxide in an autoclave at from 70° to 80° C. until practically ordinary pressure prevails in the autoclave. The clear colorless solution obtained contains the quaternary ammonium compound formed in a good yield.

What we claim is:

1. The process of producing quaternary ammonium compounds which comprises causing an alkylene oxide to react in a closed vessel with a salt of a nitrogenous base said base being selected from the group consisting of ammonia and amines and said alkylene oxide being employed in an amount about equal to that theoretically required for the production of an alkylol quaternary ammonium compound from the base employed.

2. The process of producing quaternary ammonium compounds which comprises causing an alkylene oxide to react at a temperature up to about 100° in a closed vessel with a salt of a nitrogenous base said base being selected from the group consisting of ammonia and amines and said alkylene oxide being employed in an amount about equal to that theoretically required for the production of an alkylol quaternary ammonium compound from the base employed.

3. The process of producing quaternary ammonium compounds which comprises causing ethylene oxide to react in a closed vessel with a salt of a nitrogenous base said base being selected from the group consisting of ammonia and amines and said ethylene oxide being employed in an amount about equal to that theoretically required for the production of an ethylol quaternary ammonium compound from the base employed.

4. The process of producing quaternary ammonium compounds which comprises causing ethylene oxide to react at a temperature up to about 100° C. in a closed vessel with a salt of a nitrogenous base said base being selected from the group consisting of ammonia and amines and said ethylene oxide being employed in an amount about equal to that theoretically required for the production of an ethylol quaternary ammonium compound from the base employed.

5. The process of producing quaternary ammonium compounds which comprises causing about the amount of ethylene oxide theoretically necessary for producing the quaternary compound to react at a temperature up to about 100° C. in a closed vessel with a salt of a nitrogenous base said base being selected from the group consisting of ammonia and amines and said ethylene oxide being employed in an amount about equal to that theoretically required for the production of an ethylol quaternary ammonium compound from the base employed.

6. The process of producing quaternary ammonium compounds which comprises causing an alkylene oxide to react in a closed vessel with a salt of an amine with a strong acid said alkylene oxide being employed in an amount about equal to that theoretically required for the production of an alkylol quaternary ammonium compound from the amine employed.

7. The process of producing quaternary ammonium compounds which comprises causing an alkylene oxide to react in a closed vessel with an ammonium salt of a strong acid said alkylene oxide being employed in an amount about equal to that theoretically required for the production of an alkylol quaternary ammonium compound from the ammonium salt employed.

8. The process of producing quaternary ammonium compounds which comprises causing ethylene oxide to react at a temperature up to about 100° C. in a closed vessel with an ammonium salt of a strong inorganic acid said ethylene oxide being employed in an amount about equal to that theoretically required for the production of an ethylol quaternary ammonium compound from the ammonium salt employed.

9. The process of producing quaternary ammonium compounds which comprises causing ethylene oxide to react at a temperature up to about 100° C. in a closed vessel with a salt of an amine with a strong inorganic acid said ethylene oxide being employed in an amount about equal to that theoretically required for the production of an ethylol quaternary ammonium compound from the ammonium salt employed.

10. Tetraethanolammoniumstearate.

11. The tetraethanolammonium salt of the acid octodecyl sulphuric ester.

12. Quaternary ammonium compounds corresponding to the formula

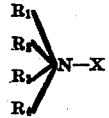

in which $R_1$ represents an alkylol group, $R_2$ a high molecular aliphatic radicle the carbon atoms of which are directly attached to one another, $R_3$ and $R_4$ are low molecular aliphatic radicles and wherein X represents an anion.

13. Quaternary ammonium compounds corresponding to the formula

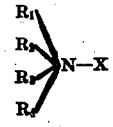

wherein $R_1$, $R_2$, $R_3$ and $R_4$ are aliphatic radicles at least one of which is an alkylol radicle and at least one of which is high molecular, the remaining ones being low molecular and free from double linkages, and wherein X represents an anion.

HEINRICH ULRICH.
ERNST PLOETZ.